United States Patent
Gidge

(10) Patent No.: US 7,199,699 B1
(45) Date of Patent: Apr. 3, 2007

(54) FACILITATING COMMUNICATION WITH POWER LINE COMMUNICATION DEVICES

(75) Inventor: Brett David Gidge, Germantown, MD (US)

(73) Assignee: Current Technologies, LLC, Germantown, MD (US)

( * ) Notice: Subject to any disclaimer, the term of this patent is extended or adjusted under 35 U.S.C. 154(b) by 601 days.

(21) Appl. No.: 10/150,694

(22) Filed: May 16, 2002

Related U.S. Application Data

(60) Provisional application No. 60/357,795, filed on Feb. 19, 2002.

(51) Int. Cl.
   *H04M 11/04* (2006.01)

(52) U.S. Cl. .......................... 340/310.11; 340/310.12; 340/310.13

(58) Field of Classification Search ........... 340/310.01, 340/310.03, 310.05, 310.08; 375/257, 259, 375/219
   See application file for complete search history.

(56) References Cited

U.S. PATENT DOCUMENTS

| | | | | |
|---|---|---|---|---|
| 2,298,435 | A | 10/1942 | Tunick | 250/15 |
| 3,445,814 | A | 5/1969 | Spalti | 340/151 |
| 3,605,009 | A | 9/1971 | Enge | 323/93 |
| 3,641,536 | A | 2/1972 | Prosprich | 340/870.15 |
| 3,656,112 | A | 4/1972 | Paull | 340/151 |
| 3,702,460 | A | 11/1972 | Blose | 340/150 |
| 3,810,096 | A | 5/1974 | Kabat et al. | 340/147 R |
| 3,895,370 | A | 7/1975 | Valentini | 340/310 |
| 3,911,415 | A | 10/1975 | Whyte | 340/310 |
| 3,942,168 | A | 3/1976 | Whyte | 340/310.01 |
| 3,942,170 | A | 3/1976 | Whyte | 340/310 |
| 3,962,547 | A | 6/1976 | Pattantyus-Abraham | 179/2.5 R |
| 3,964,048 | A | 6/1976 | Lusk et al. | 340/310 R |
| 3,967,264 | A | 6/1976 | Whyte et al. | 340/310.08 |
| 3,973,240 | A | 8/1976 | Fong | 340/151 |
| 4,004,110 | A | 1/1977 | Whyte | 179/170 J |
| 4,004,257 | A | 1/1977 | Geissler | |
| 4,012,733 | A | 3/1977 | Whyte | 340/310 |
| 4,016,429 | A | 4/1977 | Vercellotti et al. | 307/149 |
| 4,057,793 | A | 11/1977 | Johnson et al. | 340/310 R |
| 4,060,735 | A | 11/1977 | Pascucci et al. | 307/3 |

(Continued)

FOREIGN PATENT DOCUMENTS

DE 197 28 270 A1 1/1999

(Continued)

OTHER PUBLICATIONS

U.S. Appl. No. 09/765,910, filed Jan. 19, 2001, Kline.

(Continued)

*Primary Examiner*—Toan N. Pham
(74) *Attorney, Agent, or Firm*—Mel Barnes; Capital Legal Group, LLC

(57) ABSTRACT

The invention includes a method, system, and device for communicating a data signal with a low voltage premise network. The inventive method comprises communicating the data signal with the low voltage premise network, substantially reducing attenuation of the data signal caused by one or more components on the low voltage premise network, and communicating the data signal with a power line communication device. The substantial reduction of the attenuation of the data signal may be accomplished by a device whose impedance varies with frequency. The device may exhibit a higher impedance at higher frequencies and/or a lower impedance at lower frequencies.

29 Claims, 4 Drawing Sheets

U.S. PATENT DOCUMENTS

| | | | |
|---|---|---|---|
| 4,070,572 A | 1/1978 | Summerhayes | 250/199 |
| 4,119,948 A | 10/1978 | Ward et al. | 340/870.02 |
| 4,142,178 A | 2/1979 | Whyte et al. | 340/310 |
| 4,188,619 A | 2/1980 | Perkins | 340/310 R |
| 4,239,940 A | 12/1980 | Dorfman | 179/2.51 |
| 4,254,402 A | 3/1981 | Perkins | 340/310 R |
| 4,268,818 A | 5/1981 | Davis et al. | 340/870.38 |
| 4,323,882 A | 4/1982 | Gajjer | 340/310 R |
| 4,357,598 A | 11/1982 | Melvin, Jr. | 340/310 A |
| 4,408,186 A | 10/1983 | Howell | 340/310 A |
| 4,433,284 A | 2/1984 | Perkins | 323/361 |
| 4,442,492 A | 4/1984 | Karlsson et al. | 364/464 |
| 4,457,014 A | 6/1984 | Bloy | 381/98 |
| 4,468,792 A | 8/1984 | Baker et al. | 375/45 |
| 4,473,816 A | 9/1984 | Perkins | 340/310 |
| 4,473,817 A | 9/1984 | Perkins | 340/310 |
| 4,481,501 A | 11/1984 | Perkins | 340/310 |
| 4,495,386 A | 1/1985 | Brown et al. | 455/402 |
| 4,569,045 A | 2/1986 | Schieble et al. | 370/85 |
| 4,642,607 A | 2/1987 | Strom et al. | 340/310 |
| 4,644,321 A | 2/1987 | Kennon | 340/310 A |
| 4,652,855 A | 3/1987 | Weikel | 340/310 |
| 4,675,648 A | 6/1987 | Roth et al. | 340/310.07 |
| 4,683,450 A | 7/1987 | Max et al. | 333/202 |
| 4,686,382 A | 8/1987 | Shuey | 307/149 |
| 4,686,641 A | 8/1987 | Evans | 364/580 |
| 4,697,166 A | 9/1987 | Warnagiris et al. | 340/310 R |
| 4,745,391 A | 5/1988 | Gajjar | 340/310 A |
| 4,746,897 A | 5/1988 | Shuey | 340/310 R |
| 4,749,992 A | 6/1988 | Fitzmeyer et al. | 340/870.02 |
| 4,766,414 A | 8/1988 | Shuey | 340/310 A |
| 4,772,870 A | 9/1988 | Reyes | |
| 4,785,195 A | 11/1988 | Rochelle et al. | 307/18 |
| 4,800,363 A | 1/1989 | Braun et al. | 340/310 A |
| 4,835,517 A | 5/1989 | van der Gracht et al. | 340/310 A |
| 4,903,006 A | 2/1990 | Boomgaard | 340/310 A |
| 4,973,940 A | 11/1990 | Sakai et al. | 340/310 R |
| 4,979,183 A | 12/1990 | Cowart | 375/142 |
| 5,006,846 A | 4/1991 | Granville et al. | 340/870.28 |
| 5,066,939 A | 11/1991 | Mansfield, Jr. | 340/310 R |
| 5,148,144 A | 9/1992 | Sutterlin et al. | 340/310 A |
| 5,185,591 A | 2/1993 | Shuey | 340/310 A |
| 5,191,467 A | 3/1993 | Kapany et al. | 359/341 |
| 5,210,519 A | 5/1993 | Moore | 340/310 |
| 5,257,006 A | 10/1993 | Graham et al. | 340/310 A |
| 5,301,208 A | 4/1994 | Rhodes | 375/36 |
| 5,319,634 A | 6/1994 | Bartholomew et al. | 370/18 |
| 5,351,272 A | 9/1994 | Abraham | 375/38 |
| 5,355,109 A | 10/1994 | Yamazaki | |
| 5,359,625 A | 10/1994 | Vander Mey et al. | 375/1 |
| 5,369,356 A | 11/1994 | Kinney et al. | 324/142 |
| 5,375,141 A | 12/1994 | Takahashi | 375/1 |
| 5,406,249 A | 4/1995 | Pettus | 340/310.06 |
| 5,410,720 A | 4/1995 | Osterman | 725/150 |
| 5,426,360 A | 6/1995 | Maraio et al. | 324/126 |
| 5,432,841 A | 7/1995 | Rimer | 455/457 |
| 5,448,229 A | 9/1995 | Lee, Jr. | 340/870.02 |
| 5,461,629 A | 10/1995 | Sutterlin et al. | 371/30 |
| 5,485,040 A | 1/1996 | Sutterlin | 307/3 |
| 5,497,142 A | 3/1996 | Chaffanjon | 340/310.06 |
| 5,498,956 A | 3/1996 | Kinney et al. | 324/142 |
| 4,749,992 A | 6/1996 | Fitzmeyer et al. | 340/870.02 |
| 5,533,054 A | 7/1996 | DeAndrea et al. | 375/286 |
| 5,537,087 A | 7/1996 | Naito | |
| 5,559,377 A | 9/1996 | Abraham | 307/104 |
| 5,579,221 A | 11/1996 | Mun | 364/188 |
| 5,579,335 A | 11/1996 | Sutterlin et al. | 375/200 |
| 5,592,482 A | 1/1997 | Abraham | 348/8 |
| 5,598,406 A | 1/1997 | Albrecht et al. | 370/296 |
| 5,616,969 A | 4/1997 | Morava | 307/91 |
| 5,625,863 A | 4/1997 | Abraham | 455/3.3 |
| 5,630,204 A | 5/1997 | Hylton et al. | 455/3.3 |
| 5,640,416 A | 6/1997 | Chalmers | 375/147 |
| 5,664,002 A | 9/1997 | Skinner, Sr. | 379/56.2 |
| 5,684,450 A | 11/1997 | Brown | 340/310.02 |
| 5,691,691 A | 11/1997 | Merwin et al. | 340/310.02 |
| 5,694,108 A | 12/1997 | Shuey | 340/310.01 |
| 5,705,974 A | 1/1998 | Patel et al. | 340/310.08 |
| 5,712,614 A | 1/1998 | Patel et al. | 340/310.03 |
| 5,717,685 A | 2/1998 | Abraham | 370/30 |
| 5,726,980 A | 3/1998 | Rickard | 370/293 |
| 5,748,671 A | 5/1998 | Sutterlin et al. | 375/206 |
| 5,770,996 A | 6/1998 | Severson et al. | 340/310.08 |
| 5,774,526 A | 6/1998 | Propp et al. | 379/90.1 |
| 5,777,544 A | 7/1998 | Vander Mey et al. | 340/310.06 |
| 5,777,545 A | 7/1998 | Patel et al. | 341/310.06 |
| 5,777,769 A | 7/1998 | Coutinho | 359/173 |
| 5,778,116 A | 7/1998 | Tomich | 385/16 |
| 5,796,607 A | 8/1998 | Le Van Suu | 364/140.01 |
| 5,802,102 A | 9/1998 | Davidovici | 375/152 |
| 5,805,053 A | 9/1998 | Patel et al. | 340/310.01 |
| 5,818,127 A | 10/1998 | Abraham | 307/106 |
| 5,828,293 A | 10/1998 | Rickard | 340/310.04 |
| 5,835,005 A | 11/1998 | Furukawa et al. | 340/310.01 |
| 5,847,447 A | 12/1998 | Rozin et al. | 257/678 |
| 5,856,776 A | 1/1999 | Armstrong et al. | 340/310.01 |
| 5,864,284 A | 1/1999 | Sanderson et al. | 340/310.01 |
| 5,870,016 A | 2/1999 | Shresthe | 340/310.01 |
| 5,880,677 A | 3/1999 | Lestician | 340/825.06 |
| 5,881,098 A | 3/1999 | Tzou | 375/152 |
| 5,892,430 A | 4/1999 | Wiesman et al. | 340/310.01 |
| 5,929,750 A | 7/1999 | Brown | 340/310.02 |
| 5,933,071 A | 8/1999 | Brown | 340/310.01 |
| 5,933,073 A | 8/1999 | Shuey | 340/310.07 |
| 5,937,003 A | 8/1999 | Sutterlin et al. | 375/208 |
| 5,937,342 A | 8/1999 | Kline | 455/402 |
| 5,949,327 A | 9/1999 | Brown | 340/310.01 |
| 5,952,914 A | 9/1999 | Wynn | |
| 5,963,585 A | 10/1999 | Omura et al. | 375/207 |
| 5,977,650 A | 11/1999 | Rickard et al. | 307/3 |
| 5,978,371 A | 11/1999 | Mason, Jr. et al. | 370/389 |
| 5,982,276 A | 11/1999 | Stewart | 340/310.01 |
| 5,994,998 A | 11/1999 | Fisher et al. | 340/310.01 |
| 6,014,386 A | 1/2000 | Abraham | 370/485 |
| 6,023,106 A | 2/2000 | Abraham | 307/3 |
| 6,037,678 A | 3/2000 | Rickard | 307/89 |
| 6,040,759 A | 3/2000 | Sanderson | 340/310.01 |
| 6,091,932 A | 7/2000 | Langlais | 455/5.1 |
| 6,104,707 A | 8/2000 | Abraham | 370/295 |
| 6,127,939 A * | 10/2000 | Lesesky et al. | 340/438 |
| 6,140,911 A | 10/2000 | Fisher et al. | 340/310.01 |
| 6,144,292 A | 11/2000 | Brown | 340/310.02 |
| 6,151,330 A | 11/2000 | Liberman | 370/449 |
| 6,157,292 A | 12/2000 | Piercy et al. | 340/310.01 |
| 6,172,597 B1 | 1/2001 | Brown | 340/310.02 |
| 6,177,849 B1 | 1/2001 | Barsellotti et al. | 333/177 |
| 6,212,658 B1 | 4/2001 | Le Van Suu | 714/749 |
| 6,226,166 B1 | 5/2001 | Gumley et al. | 361/118 |
| 6,239,722 B1 | 5/2001 | Colton et al. | 340/870.02 |
| 6,278,357 B1 * | 8/2001 | Croushore et al. | 375/259 |
| 6,282,405 B1 | 8/2001 | Brown | 725/79 |
| 6,297,729 B1 | 10/2001 | Abali et al. | 340/310.01 |
| 6,297,730 B1 | 10/2001 | Dickinson | 340/310.01 |
| 6,317,031 B1 | 11/2001 | Rickard | 340/310.03 |
| 6,331,814 B1 | 12/2001 | Albano et al. | 340/310.01 |
| 6,335,672 B1 | 1/2002 | Tumlin et al. | |
| 6,373,376 B1 | 4/2002 | Adams et al. | 340/310.01 |
| 6,396,391 B1 | 5/2002 | Binder | 340/310.01 |
| 6,396,392 B1 | 5/2002 | Abraham | 340/310.01 |
| 6,404,773 B1 | 6/2002 | Williams et al. | 370/463 |
| 6,407,987 B1 | 6/2002 | Abraham | 370/295 |
| 6,414,578 B1 | 7/2002 | Jitaru | 336/170 |
| 6,425,852 B1 | 7/2002 | Epstein et al. | 600/13 |

| | | | |
|---|---|---|---|
| 6,441,723 B1 | 8/2002 | Mansfield, Jr. et al. | 340/310.01 |
| 6,452,482 B1 | 9/2002 | Cern | 340/310.01 |
| 6,480,510 B1 | 11/2002 | Binder | 370/502 |
| 6,486,747 B1 | 11/2002 | DeCramer et al. | 333/25 |
| 6,496,104 B2 | 12/2002 | Kline | 340/310.01 |
| 6,504,357 B1 | 1/2003 | Hemminger et al. | 340/310.01 |
| 6,590,493 B1 | 7/2003 | Rasimas | |
| 6,624,745 B1 | 9/2003 | Willer | |
| 6,667,685 B2 | 12/2003 | Wasaki et al. | |
| 6,760,384 B1 * | 7/2004 | Garreau et al. | 375/260 |
| 6,771,775 B1 | 8/2004 | Widmer | |
| 6,785,532 B1 | 8/2004 | Rickard | |
| 6,933,835 B2 | 8/2005 | Kline | |
| 6,937,056 B2 | 8/2005 | Binder | |
| 6,950,567 B2 | 9/2005 | Kline | |
| 6,952,159 B1 | 10/2005 | Muller | |
| 6,958,680 B2 | 10/2005 | Kline | |
| 6,965,302 B2 | 11/2005 | Mollenkopf et al. | |
| 6,977,578 B2 | 12/2005 | Kline | |
| 7,053,756 B2 | 5/2006 | Mollenkopf et al. | |
| 2001/0038329 A1 | 11/2001 | Diamanti et al. | 340/310.01 |
| 2001/0038343 A1 | 11/2001 | Meyer et al. | 340/870.02 |
| 2001/0045888 A1 | 11/2001 | Kline | |
| 2001/0052843 A1 | 12/2001 | Wiesman et al. | 340/310.01 |
| 2001/0054953 A1 | 12/2001 | Kline | 340/310.01 |
| 2002/0002040 A1 | 1/2002 | Kline et al. | |
| 2002/0010870 A1 | 1/2002 | Gardner | 713/300 |
| 2002/0014884 A1 | 2/2002 | Chung | 324/74 |
| 2002/0027496 A1 | 3/2002 | Cern | 340/310.01 |
| 2002/0041228 A1 | 4/2002 | Zhang | 340/310.01 |
| 2002/0060624 A1 | 5/2002 | Zhang | 340/310.01 |
| 2002/0071452 A1 | 6/2002 | Abraham | 370/480 |
| 2002/0075097 A1 | 6/2002 | Brown et al. | |
| 2002/0080010 A1 | 6/2002 | Zhang | 340/310.06 |
| 2002/0095662 A1 | 7/2002 | Ashlock et al. | 717/136 |
| 2002/0097953 A1 | 7/2002 | Kline | |
| 2002/0098867 A1 | 7/2002 | Meiksen et al. | 455/560 |
| 2002/0105413 A1 | 8/2002 | Cern | 340/310.01 |
| 2002/0110310 A1 | 8/2002 | Kline | |
| 2002/0110311 A1 | 8/2002 | Kline | |
| 2002/0118101 A1 | 8/2002 | Kline | |
| 2002/0121963 A1 | 9/2002 | Kline | |
| 2002/0140547 A1 | 10/2002 | Litwin, Jr. et al. | 340/310.01 |
| 2002/0154000 A1 | 10/2002 | Kline | |
| 2002/0171535 A1 | 11/2002 | Cern | 340/310.07 |
| 2003/0062990 A1 | 4/2003 | Schaeffer, Jr. et al. | 340/310.01 |
| 2003/0067910 A1 | 4/2003 | Razazian et al. | 370/352 |
| 2003/0169155 A1 | 9/2003 | Mollenkopf et al. | |
| 2003/0210135 A1 | 11/2003 | Cern | 340/310.07 |
| 2003/0224784 A1 | 12/2003 | Hunt et al. | |
| 2004/0056734 A1 | 3/2004 | Davidow | |
| 2004/0085172 A1 | 5/2004 | Cern | |
| 2004/0113756 A1 | 6/2004 | Mollenkopf | |
| 2004/0113757 A1 | 6/2004 | White, II et al. | |
| 2004/0223617 A1 | 11/2004 | Corcoran et al. | |
| 2004/0227621 A1 | 11/2004 | Cope et al. | |
| 2004/0227622 A1 | 11/2004 | Giannini et al. | |
| 2004/0242185 A1 | 12/2004 | Lee | |
| 2005/0007241 A1 | 1/2005 | Kline | |
| 2005/0128057 A1 | 6/2005 | Mansfield et al. | |

FOREIGN PATENT DOCUMENTS

| | | |
|---|---|---|
| DE | 100 12 235 C2 | 12/2001 |
| EP | 0 141 673 A2 | 5/1985 |
| EP | 0 581 361 A1 | 2/1994 |
| EP | 0 470 185 B1 | 11/1995 |
| EP | 0 913 955 A2 | 5/1999 |
| EP | 0 948 143 A2 | 10/1999 |
| EP | 0 959 569 A1 | 11/1999 |
| EP | 1 011 235 A2 | 6/2000 |
| EP | 1 014 640 A2 | 6/2000 |
| EP | 0 916 194 B1 | 9/2001 |
| EP | 1 011 235 A3 | 5/2002 |
| EP | 1 213 849 A1 | 6/2002 |
| EP | 1 014 640 A3 | 7/2002 |
| EP | 1 021 866 B1 | 10/2002 |
| ES | 2 122 920 A1 | 12/1998 |
| GB | 2 293 950 A | 4/1996 |
| GB | 2 315 937 A | 2/1998 |
| GB | 2 331 683 A | 5/1999 |
| GB | 2 335 335 A | 9/1999 |
| GB | 2 341 776 A | 3/2000 |
| GB | 2 342 264 A | 4/2000 |
| GB | 2 347 601 A | 9/2000 |
| JP | 1276933 | 11/1989 |
| WO | 95/29536 A1 | 11/1995 |
| WO | 98/01905 A1 | 1/1998 |
| WO | 98/33258 A2 | 7/1998 |
| WO | 98/33258 A3 | 7/1998 |
| WO | 98/40980 A1 | 9/1998 |
| WO | 00/59076 A1 | 10/2000 |
| WO | 00/60701 A1 | 10/2000 |
| WO | 01/08321 A1 | 2/2001 |
| WO | 01/43305 A1 | 6/2001 |
| WO | 01/82497 A1 | 11/2001 |
| WO | 02/054605 A1 | 7/2002 |
| WO | 02/065684 A2 | 8/2002 |
| WO | WO-02/089352 A1 | 11/2002 |
| WO | WO-03/039022 A1 | 5/2003 |

OTHER PUBLICATIONS

U.S. Appl. No. 09/805,638, filed Mar. 14, 2001, Kline.
U.S. Appl. No. 09/835,532, filed Apr. 16, 2001, Kline.
U.S. Appl. No. 09/837,972, filed Apr. 19, 2001, Kline et al.
U.S. Appl. No. 09/912,633, filed Jul. 25, 2001, Kline.
U.S. Appl. No. 09/915,459, filed Jul. 26, 2001, Kline.
U.S. Appl. No. 09/924,730, filed Aug. 8, 2001, Kline.
U.S. Appl. No. 10/016,998, filed Dec. 14, 2001, Kline.
U.S. Appl. No. 10/036,914, filed Dec. 21, 2001, Mollenkopf et al.
U.S. Appl. No. 10/075,708, filed Feb. 14, 2002, Kline.
U.S. Appl. No. 10/075,332, filed Feb. 14, 2002, Kline.
U.S. Appl. No. 10/150,694, filed May 16, 2002, Gidge.
U.S. Appl. No. 10/165,992, filed Jun. 10, 2002, Kline.
U.S. Appl. No. 10/176,500, filed Jun. 21, 2002, Pridmore, Jr. et al.
U.S. Appl. No. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
Patent Abstracts of Japan, Japanese Publication No. 10200544 A2, published Jul. 31, 1998, (Matsushita Electric Works, LTD).
Tohoku Electric Power, Co., Inc., "Tohoku Electric Develops High-Speed Communications System Using Power Distribution Lines," *Tohoku Currents*, Spring 1998, 8(1), 2 pages (http://www.tohoku-epco.co.jp/profil/kurozu/c_vol8_1/art04.htm).
Power Line Communications Conference entitled, "PLC, A New Competitor in Broadband Internet Access," Dec. 11-12, 2001, Washington, D.C., 60 pages.
Rivkin, S. R., "Co-Evolution of Electric & Telecommunications Networks," *The Electricity Journal*, May 1998, 71-76.
Marketing Assessment Presentation entitled "Powerline Telecommunications," The Shpigler Group for CITI PLT, Jul. 16, 2002, 9 pages.
Campbell, C., presentation entitled "Building a Business Case for PLC: Lessons Learned From the Communication Industry Trenches," KPMG Consulting, Jul. 16, 2002, 5 pages.
"Embedded Power Line Carrier Modem," Archnet Electronic Technology, http://www.archnetco.com/english/product/ATL90.htm, 2001, 3 pages.
"Archnet: Automatic Meter Reading System Power Line Carrier Communication", www.archnetco.com/english/product/product_sl.htm, 3 pages.

"Power Line Communications Solutions", www.echelon.com/products/oem/transceivers/powerline/default.htm, 2 pages.

"Texas Instruments: System Block Diagrams; Power Line Communication (Generic)", http://focus.ti.com/docs/apps/catalog/resources/blockdiagram.jhtml?bdId=638, 1 page.

Feduschak, N.A., "Waiting in the Wings: Is Powerline Technology Ready to Compete with Cable?", Mar. 2001, www.cabletoday.com/ic2/archives/0301/0301powerline.htm, 5 pages.

"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62, 1-11.

"Intellon Corporation Test Summary for Transformerless Coupler Study", *Intellon No News Wires*, Dec. 24, 1998, DOT/NHTSA Order No. DTNH22-98-P-07632, pp 1-18.

*EMECTCON Automated Distribution System*, ABB Power T & D Company, Inc., Jan. 1990, Raleigh, North Carolina, No B-919A, 14 pages.

"Dedicated Passive Backbone for Power Line Communications", *IBM Technical Disclosure Bulletin*, Jul. 1997, 40(7), 183-185.

Coaxial Feeder Cables [Engineering Notes], *PYE Telecommunications Limited Publication Ref No. TSP507/1*, Jun. 1975, Cambridge, England, 15 pages.

"Centralized Commercial Building Applications with the Lonworks ® PLT-21 Power Line Transceiver", *Lonworks Engineering Bulletin*, Echelon, Apr. 1997, pp 1-22.

Plexeon Logistics, Inc., "Power Line Communications", www.plexeon.com/power.html, 2 pages.

"EMETCON Automated Distribution System: Communications Guide", *Westinghouse ABB Power T & D Company Technical Manual 42-6001A*, Sep. 1989, 55 pages.

Abraham, K.C. et al., "A Novel High-Speed PLC Communication Modem", *IEEE Transactions on Power Delivery*, 1992, 7(4), 1760-1768.

J.M. Barstow., "A Carrier Telephone System for Rural Service", *AIEE Transactions*, 1947, 66, 301-307.

Chang, S.S.L., "Power-Line Carrier", *Fundamentals Handbook of Electrical and Computer Engineering*, Volume II-Communication, Control, Devices and Systems, John Wiley & Sons, 617-627.

Chen, Y-F. et al. "Baseband Transceiver Design of a 128-Kbps Power-Line Modem for Household Applications", *IEEE Transactions on Power Delivery*, 2002, 17(2), 338-344.

Coakley, N.G. et al., "Real-Time Control of a Servosystem Using the Inverter-Fed Power Lines to Communicate Sensor Feedback", *IEEE Transactions on Industrial Electronics*, 1999, 46(2), 360-369.

Esmailian, T. et al., "A Discrete Multitone Power Line Communication System", *Department of Electrical and Computer Engineering*, University of Toronto, Ontario Canada, 2000 IEEE, pp 2953-2956.

Kawamura, A. et al., "Autonomous Decentralized Manufacturing System Using High-speed Network with Inductive Transmission of Data and Power", *IEEE*, 1996, 940-945.

Kilbourne, B. "EEI Electric Perspectives: The Final Connection", www.eei.org/ep/editorial/Jul-01/0701conenct.htm, 7 pages.

Kim, W-O., et al., "A Control Network Architecture Based on EIA-709.1 Protocol for Power Line Data Communications", *IEEE Transactions on Consumer Electronics*, 2002, 48(3), 650-655.

Lim, C.K. et al., "Development of a Test Bed for High-Speed Power Line Communications", School of Electrical and Electronic Engineering, Nanyang Technological University, Singapore, *IEEE*, 2000, 451-456.

Lokken, G. et al., "The Proposed Wisconsin electric Power Company Load Management System Using Power Line Carrier Over Distribution Lines", *1976 National Telecommunications Conference, IEEE*, 1976, 2.2-12.2-3.

Marthe, E. et al., "Indoor Radiated Emission Associated with Power Line Communication Systems", *Swiss Federal Institute of Technology Power Systems Laboratory IEEE*, 2001, 517-520.

Naredo, J.L. et al., "Design of Power Line Carrier Systems on Multitransposed Delta Transmission Lines", *IEEE Transactions on Power Delivery*, 1991, 6(3), 952-958.

Nichols, K., "Build a Pair of Line-Carrier Modems", *CRC Electronics-Radio Electronics*, 1988, 87-91.

Okazaki, H, et al., "A Transmitting, and Receiving Method for CDMA Communications Over Indoor Electrical Power Lines", *IEEE*, 1998, pp VI-522-VI-528.

B. Don Russell, "Communication Alternatives for Distribution Metering and Load Management", *IEEE Transactions on Power Apparatus and Systems*, 1980, vol. PAS-99(40), pp 1448-1455.

Sado, WN. et al., "Personal Communication on Residential Power Lines- Assessment of Channel Parameters", *IEEE*, 532-537.

International Search Report dated May 2, 2001, from PCT/US01/01810.

International Search dated Jul. 16, 2001, from PCT/US01/12699.

International Search Report dated Oct. 22, 2001, from PCT/US01/12291.

International Search Report dated Jun. 5, 2002, from PCT/US01/48064.

Written Opinion dated May 15, 2002, from PCT/US01/12699.

International Search Report dated Jun. 24, 2002, from PCT/US02/04310.

International Search Report dated Aug. 7, 2002, from PCT/US02/04300.

Written Opinion dated Mar. 21, 2003, from PCT/US02/04300.

\* cited by examiner

FACILITATING COMMUNICATION WITH POWER LINE COMMUNICATION DEVICES

CROSS-REFERENCE TO RELATED APPLICATIONS

This application claims priority under 35 U.S.C. § 119 (e) from provisional application No. 60/357,795 filed Feb. 19, 2002, which is incorporated by reference herein in its entirety.

TECHNICAL FIELD OF THE INVENTION

The present invention relates to data communications, and more particularly to data communication systems over electrical power networks.

BACKGROUND OF THE INVENTION

Recently, several technologies that provide broadband data access have entered the market. These technologies include digital subscriber lines (DSL), cable modems, and wireless networks, among others. Another emerging technology uses existing electrical power distribution networks to carry data signals to and from individual customer premises. Such systems may be referred to throughout as "power line communication systems." Because electrical power distribution networks have been designed to carry low-frequency high-voltage signals, transmitting higher frequency data signals on the electrical power distribution network often face obstacles not confronted by their lower frequency counterparts.

One particular impediment is not a part of the network of low voltage cables originally installed. This impediment may be created by devices and appliances that are "plugged into" the low voltage premise network. These devices will be referred to as "power line non-communication devices," because traditionally they receive power and do not exchange data over the premise network. "Power line communication devices," on the other hand, refer to devices designed to communicate with higher frequency data signals, like modems and computing devices, over the premise network. Because the low voltage premise network originally was not created to carry and process higher frequency data signals, the traditional power line non-communication devices were created without concern of their effect on such higher frequency data signals. In fact, often many of the non-communication devices that typically plug into electrical receptacles connected to the low voltage premise network have certain components that will attenuate or "load down" higher frequency signals.

For example, many existing power line non-communication devices have decoupling capacitors. The decoupling capacitors have the beneficial effect of filtering high frequency signals or "noise" from adversely influencing the operation of the device. These decoupling capacitors typically have capacitance values in the range of 0.1 to 0.22 µF, but may have any value. The decoupling capacitors prevent the noise from influencing the device by severely reducing the high frequency signal content from entering the operational portion of the device. For example, these filtering devices are used to keep the operation of a household blender from adversely influencing a television's picture. It should be appreciated that a decoupling capacitor is just one such device that may cause such a problem in a power line communication system.

Although this solution has been effective for its intended purpose of filtering noise, it now has the unintended effect of attenuating the high frequency data signals communicated over the low voltage network. As a result, the ability of the low voltage premise network to operate as a high frequency data network is compromised.

Therefore, there is a need to reduce the loss of the higher frequency data signals transmitted on the low voltage home premise without effecting the 50/60 Hz power signal traditionally delivered on the network.

SUMMARY OF THE INVENTION

The invention includes a method, system, and device for communicating a data signal with a low voltage premise network. The inventive method comprises communicating the data signal with the low voltage premise network, substantially reducing attenuation of the data signal caused by one or more components on the low voltage premise network, and communicating the data signal with a power line communication device. The power line communication device may be the component. Also, the component may be a decoupling capacitor and/or an appliance that is capable of communicating the data signal with the low voltage premise network. The substantial reduction of the attenuation of the data signal may be accomplished by a device whose impedance varies with frequency. The device may exhibit a higher impedance at higher frequencies and/or a lower impedance at lower frequencies. Also, the device may be at least one of the following: a receptacle, the component, a power line interface device, a power line communication device, a circuit panel, an electrical appliance, and an electrical power strip. The power line communication device may be a computer and/or a power line interface device. The method further may comprise reducing high frequency signals provided to the component by the low voltage premise network and/or reducing high frequency signals provided to the low voltage premise network by the component.

BRIEF DESCRIPTION OF THE DRAWINGS

Other features of the invention are further apparent from the following detailed description of the preferred embodiments of the invention taken in conjunction with the accompanying drawings, of which.

DETAILED DESCRIPTION OF PREFERRED EMBODIMENTS

Overview of Electric Power Transmission/Distribution System

Figure 1:
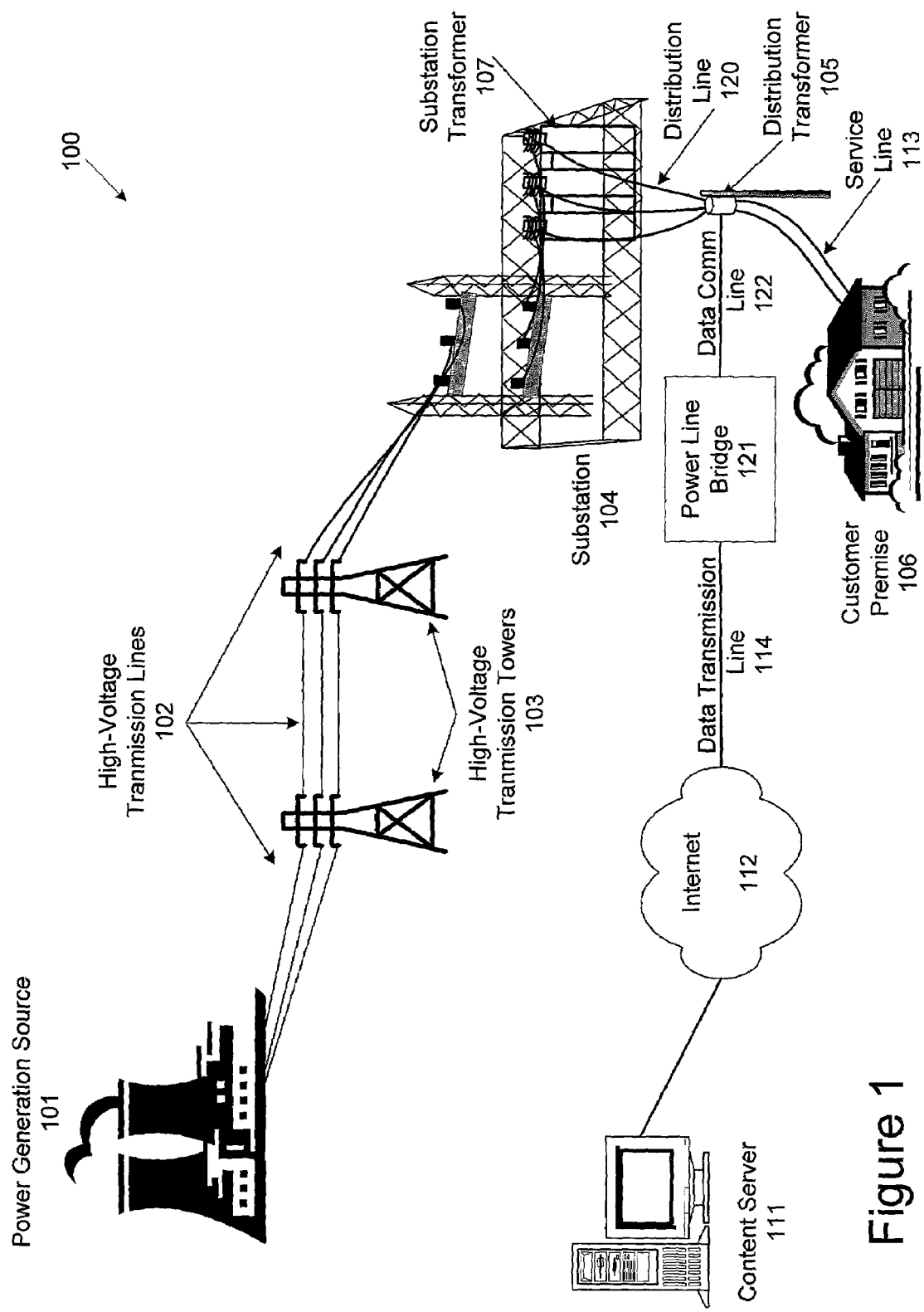
FIG. 1 is a block diagram of an electric power and data transmission system, according to the invention.

FIG. 1 is a block diagram of an electric power and data transmission system 100. Generally, electric power and data transmission system 100 has three major components: the generating facilities that produce the electric power, the transmission network that carries the electric power from the generation facilities to the distribution points, and the distribution system that delivers the electric power to the consumer. As shown in FIG. 1, a power generation source 101 is a facility that produces electric power. Power generation source 101 includes a generator (not shown) that creates the electrical power. The generator may be a gas turbine or a steam turbine operated by burning coal, oil, natural gas, or a nuclear reactor, for example. In each case, power generation source 101 provides a three-phase AC power. The AC power typically has a voltage as high as approximately 25,000 volts.

A transmission substation (not shown) then increases the voltage from power generation source 101 to high-voltage levels for long distance transmission on high-voltage transmission lines 102. Typical voltages found on high-voltage transmission lines 102 range from 69 to in excess of 800 kilovolts (kV). High-voltage transmission lines 102 are supported by high-voltage transmission towers 103. High-voltage transmission towers 103 are large metal support structures attached to the earth, so as to support the transmission lines and provide a ground potential to system 100. High-voltage transmission lines 102 carry the electric power from power generation source 101 to a substation 104.

Generally, a substation acts as a distribution point in system 100 and provides a point at which voltages are stepped-down to reduced voltage levels. Substation 104 converts the power on high-voltage transmission lines 102 from transmission voltage levels to distribution voltage levels. In particular, substation 104 uses transformers 107 that step down the transmission voltages from the 69–800 kV level to distribution voltages that typically are less than 35 kV. In addition, substation 104 may include an electrical bus (not shown) that serves to route the distribution level power in multiple directions. Furthermore, substation 104 often includes circuit breakers and switches (not shown) that permit substation 104 to be disconnected from high-voltage transmission lines 102, when a fault occurs on the lines.

Substation 104 typically is connected to at least one distribution transformer 105. Power is carried from substation transformer 107 to distribution transformer 105 over one or more distribution lines 120. Distribution transformer 105 may be a pole-top transformer located on a utility pole, a pad-mounted transformer located on the ground, or a transformer located under ground level. Distribution transformer 105 steps down the voltage to levels required by a customer premise 106, for example. Power is carried from distribution transformer 105 to customer premise 106 via one or more service lines 113. Voltages on service line 113 typically range from 240 volts to 440 volts. Also, distribution transformer 105 may function to distribute one, two or all three of the three phase currents to customer premise 106, depending upon the demands of the user. In the United States, for example, these local distribution transformers typically feed anywhere from one to ten homes, depending upon the concentration of the customer premises in a particular location.

Distribution transformer 105 also may be in communication with a power line bridge 121. Power line bridge 121 facilitates the transmission of data to electric power and data transmission system 100 over a data communication line 122. Power line bridge 121 may receive such data from a content server 111 over the Internet 112 via a data transmission line 114. Although not shown in FIG. 1, it should be appreciated that power line bridge 121 may receive data using a number of other techniques including wireless network transmission, for example. Also, power line bridge 121 may receive data that previously has been placed on electric power and data transmission system 100 at distribution line 120 and/or at high-voltage transmission lines 102, for example. In this way, data signals may be provided to customer premise 106 via a service line 113, which typically is used to carry electrical power from distribution transformer 105 to customer premise 106. These data signals often will be in a different frequency range, usually higher, than the frequency range of the electrical power traditionally provided over service line 113.

Transmitting Data Over the Low-Voltage Premise Network

Figure 2:
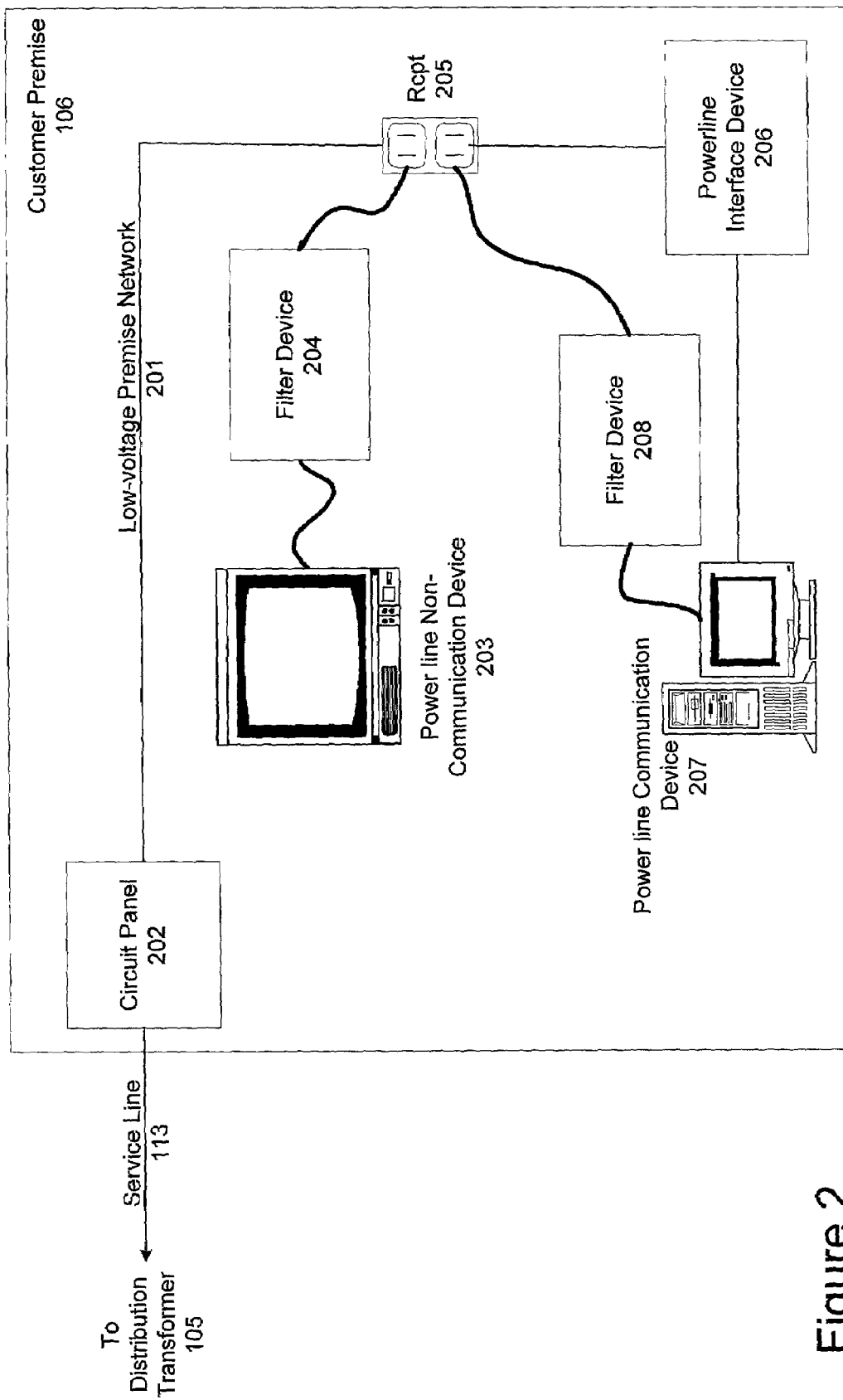
FIG. 2 is a block diagram of a portion of a low-voltage premise network, according to the invention.

FIG. 2 is a block diagram of a portion of low-voltage premise network 201 that is typical of most customer premises. Although many other components may be a part of such a network, the components shown in FIG. 2 are shown for the purpose of clarity and brevity. Nevertheless, the disclosure is not limited to the components shown in FIG. 2.

As shown in FIG. 2, distribution transformer 105 is connected via service line 113 to a circuit panel 202, typically located within customer premise 106. Circuit panel 202 has many circuit breakers that act as distribution and disconnection points for the many individual circuits (not shown) that comprise low-voltage premise network 201. Low-voltage premise network 201 conducts the power signal and the higher frequency data signal provided on service line 113 to a receptacle 205. Because receptacle 205 offers a convenient and standard power connection point, the power signal and the high frequency data signal may be conducted to devices plugged into receptacle 205.

A power line communication device 207 (e.g., a computer) typically will receive power from receptacle 205, and the data signal via a power line interface device (PLID) 206. PLID 206 selects the high frequency data and functions as a communication interface between the power line network and power line communication device 207. Also, a power line non-communication device (e.g, a television) may be in communication with and receive power from receptacle 205 via a filter device 204. Often, these devices, and perhaps the power supply of the power line communication device itself, include components (e.g., decoupling capacitors) designed to filter high frequency noise. In a power line communication system, these components also serve to attenuate the high frequency data signals. As a result, the data signal being transmitted to power line communication device 207 may be degraded. Such degradation of the data signal may limit communication data rates or perhaps prevent power line communication between power line communication devices.

One technique for substantially reducing or preventing the attenuation of the data signal by power line non-communication device 203, while permitting the flow of the power signal, is to insert filter device 204, for example, on premise network 201. Filter device 204 is in communication with low-voltage premise network 201 and with power line non-communication device 203. Filter device 204 operates to substantially prevent the loading of the data signal by power line non-communication device 203. Also, filter device 204 permits the flow of the lower frequency power signal to power line non-communication device 203 so that device 203 may operate as designed. Filter device 208 functions in a similar manner for the power supply or other similar components of a power line communication device 207.

Filter device 204 may present a high impedance to the premise network at the data signal frequencies and a lower impedance to the lower frequency power signal. As will be discussed with reference to FIGS. 3 and 4, this may be accomplished using various devices whose impedance varies with frequency. For example, inductors, ferrites, and/or capacitors can be configured into a network to achieve these frequency dependent impedance characteristics. Several network configurations include, but are not limited to, in-line, T, and π networks. The selection of the particular types of components as well as their values will vary with the characteristics of the power line communication system and the devices connected to it. For example, the operating frequency of the data signal, the required data signal to noise ratio, and the electrical current required by power line non-communication device 203 may determine the types of components and filter configuration used.

Other design considerations of filter device 204 may include analysis of the self-resonance frequency of the components used in filter device 204. For example, where filter device 204 includes inductive elements, the self-resonance frequency of the inductive elements may be designed to be above the highest possible frequency of the data signal. Also, the in-line components of filter device 204 may have a current rating higher than the maximum current of power line non-communication device 203, or the device to which it is trying to isolate from low-voltage premise network 201. In addition, filter device 204 should have components that can withstand voltages greater than the peak transient voltage on low-voltage premise network 201, for example.

Although filter device 204 is shown in FIG. 2 as being in communication with receptacle 205 and power line non-communication device 203, it should be appreciated that filter device 204 may be located anywhere in the system. Moreover, although filter device 204 is shown in FIG. 2 as a separate component from the rest of the system, it should be appreciated that the functionality of filter device 204 may be implemented in a number of possible configurations. For example, filter device 204 may be a "pronged" device capable of plugging directly into receptacle 205 such that power line non-communication device 203 may be plugged directly into filter device 204. This configuration is similar to frequency adapters used to permit 60 Hertz (Hz) equipment to operate on 50 Hz electrical power systems. Also, filter device 204 may be manufactured to be located within the particular power line non-communication device 203. Another embodiment may permit filter device 204 to be an integral part of receptacle 205, or incorporated into an electrical power strip. It should be appreciated that the functionality and operation of filter device 204 should not be confined to any particular individual physical component. In addition, filter device 208 may be an individual component, a part of power line communication device 207, and/or a part of PLID 206. It should be appreciated that the invention is not limited to the location of the filtering techniques, but may be implemented into any component or part of such a network.

Figure 3:
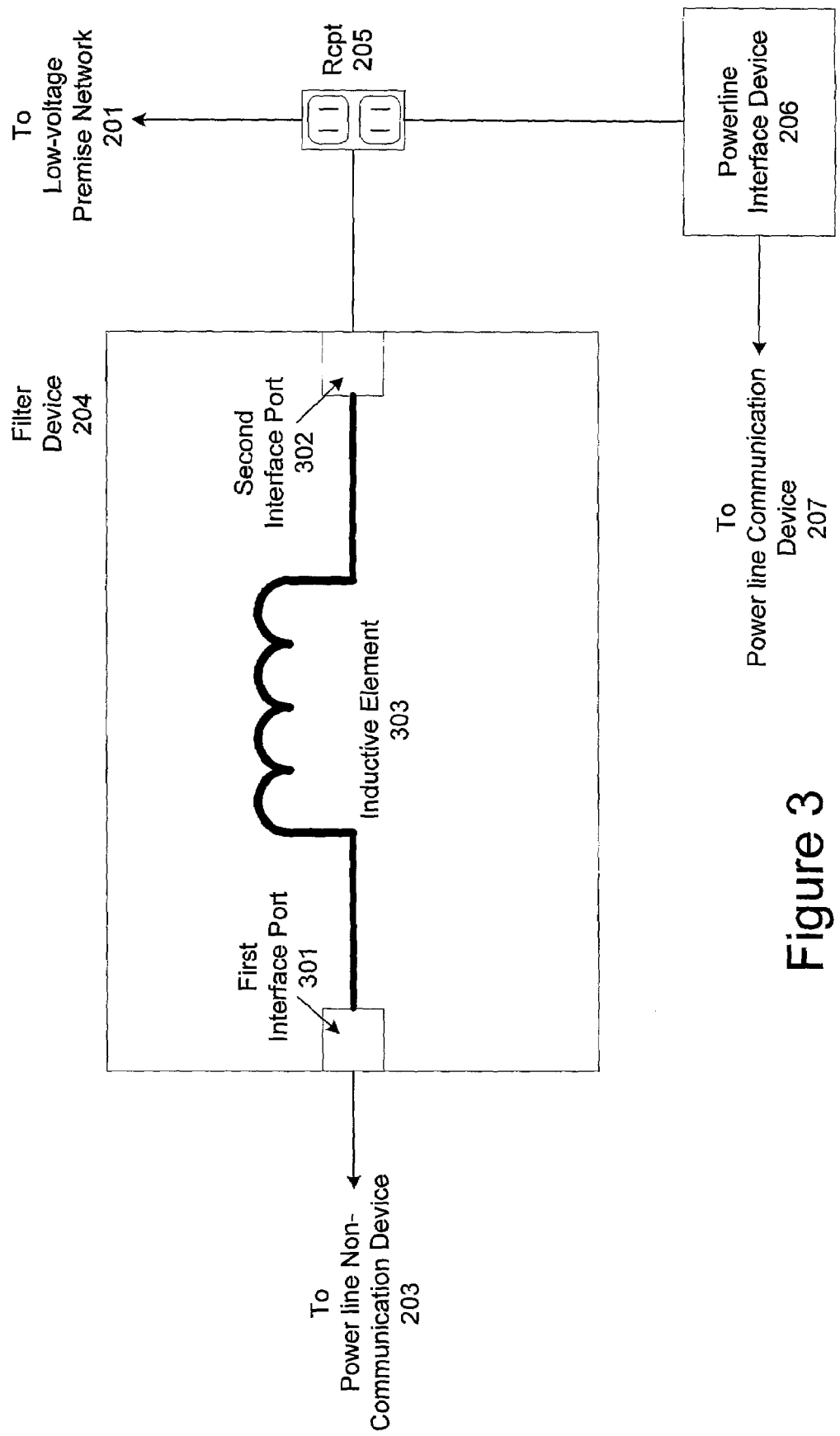
FIG. 3 is a block diagram of one example of a filter device, according to the invention.

FIG. 3 provides a block diagram further detailing an example of filter device 204. It should be appreciated that the construction and components shown in FIG. 3 provide just one possible example, and is not meant to be exhaustive. As shown in FIG. 3, power line non-communication device 203 is in communication with a first interface port 301 on filter device 204. Power line communication device 207 is in communication with a second interface port 302 via PLID 206 and receptacle 205. Also, low-voltage premise network 201 is in communication with second interface port 302 via receptacle 205. An inductive element 303 is in communication with first interface port 301 and with second interface port 302. Although filter device 204 is shown connected to a single conductor coming from receptacle 205, it should be appreciated that a similar configuration may be provided on one or more conductors (e.g., "hot", neutral or ground conductors), as will be discussed further with reference to FIG. 4.

In operation, low-voltage premise network 201 provides the low frequency power signal and the higher frequency data signal to receptacle 205. Receptacle 205 may provide both signals to all devices plugged into it. Second interface port 302 on filter device 204 receives the low frequency power signal and the higher frequency data signal from receptacle 205. Inductive element 303 is selected based on the characteristics of the low frequency power signal and the higher frequency data signal such that filter device 204 passes the low frequency power signal, while substantially blocking the higher frequency data signal. As a result, power line non-communication device 203 receives the low frequency power signal needed for its normal operation, but is prevented from receiving, and thus undesirably loading the higher frequency data signal. Although inductive element 303 is shown in FIG. 3, it should be appreciated that configuration may serve to pass the lower frequency power signal and block the higher frequency data signal.

As is well known to those skilled in the art, low-voltage premise network 201 typically includes three main conductors: the current carrying conductor (i.e., the "hot" conductor), the neutral conductor, and the ground conductor. Although a single line is shown connecting filter device 204 to the system in FIGS. 2 and 3, it should be appreciated that filter device 204 may be connected to any combination of the conductors, as required by the particular circumstances.

In one embodiment, for example, filter device 204 may include one or more inductors on both the "hot" and neutral conductors. Assuming a power line communication system with a minimum high frequency data signal of 4 MHz and a premise network with a 40–50 ohm characteristic impedance, a 10 µH inductor for each would provide a minimum input impedance at the data frequency of approximately 500 ohms [i.e., $2(2\pi)(4e^{6})(10e^{-6})=502.65$] for filter device 204 as seen from premise network 201. Assuming a maximum data signal frequency of 24 MHz, a series resonance frequency (SRF) of 35 MHz for the inductor may be sufficient. In addition, the 10 µH inductor may have a current rating greater than the maximum required current draw of power line non-communication device 203. Given the current draw of power line non-communication device 203, the combined DC resistance of the inductors should be low enough so as to not degrade the power signal to a point where power line non-communication device 203 no longer functions as intended. The inductor may also have a withstand voltage rating greater than the maximum transient voltage that may be seen across its terminals in the given application. As will be discussed, low capacitance transient protection (e.g., Metal Oxide Varistor in series with a Gas Discharge Tube) may be used in cases of very high transient environments.

As another design consideration, a decoupling capacitor, high frequency shunt circuit, or other similar circuit may be used in filter device 204 on the side connected to power line non-communication device 203 to further reduce the amount of high frequency data signal and/or noise on premise network 201 that will reach power line non-communication device 203. In addition, such a configuration may assist in preventing noise generated by power line non-communication device 203 from entering low-voltage premise network 201.

Figure 4:
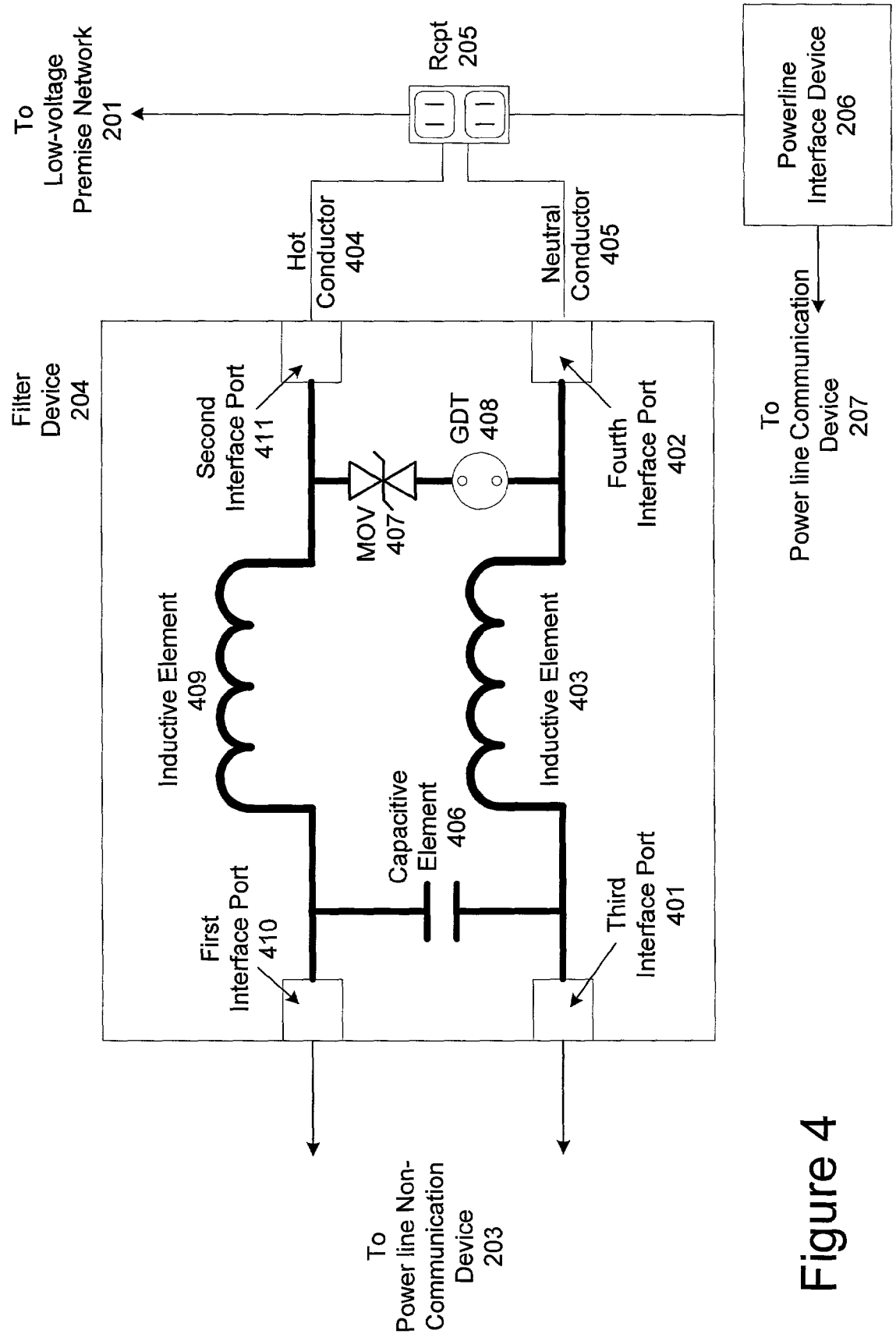
FIG. 4 is a block diagram of another example of a filter device, according to the invention.

FIG. 4 provides a block diagram illustrating an example of filter device 204 that may meet such design considerations. As shown in FIG. 4, filter device 204 includes a first interface port 410, a second interface port 411, a third interface port 401, and a fourth interface port 402. First interface port 410 and third interface port 401 are in communication with power line non-communication device 203. Second interface port 411 and fourth interface port 402 are in communication with low-voltage premise network 201 via receptacle 205. In particular, second interface port 411 is in communication with a current-carrying conductor 404 (i.e., the "hot" conductor) and fourth interface port 402 is in communication with neutral conductor 405. Neutral conductor 405 and hot conductor 404 are conductors typically found in low-voltage premise network 201, and well known to those skilled in the art.

Second interface port 411 may be connected to first interface port 410 via an inductive element 409, for example an inductor. Similarly, third interface port 401 may be connected to fourth interface port 402 via an inductive element 403. Similar to inductive element 303 discussed with reference to FIG. 3, inductive elements 403 and 409 may serve to prevent power line non-communication device 203 from attenuating the higher frequency data signal, while permitting the flow of the lower frequency power signal. Also, a metal oxide varistor (MOV) 407 and a gas discharge tube (GDT) 408 may be connected in a parallel arrangement to inductive elements 409 and 403. MOV 407 and GDT 408 may be connected on low voltage premise network 201 side of inductive elements 403 and 409. Also, a capacitive element 406 may be connected in parallel to inductive elements 403 and 409 on the side in communication with power line non-communication device 203.

In operation, MOV 407 and GDT 408 may provide low capacitance transient protection in circumstances where low-voltage premise network 201 is subject to high transients, for example. MOV 407 and GDT 408 protect network equipment, like power line non-communication device 203, from over-voltages and/or transient surges that may be found on low-voltage premise network 201. Although a GDT is shown in FIG. 4, it should be appreciated that other devices providing similar functionality are contemplated by the invention. Capacitive element 406 may operate as a decoupling capacitor or high frequency shunt circuit. In particular, capacitive element 406 may reduce the amount of high frequency data signal and/or noise that is provided by low-voltage premise network 201 from getting to power line non-communication device 203. Also, capacitive element 406 may reduce the amount of noise that may be generated by power line non-communication device 203 from getting to low-voltage premise network 201. It should also be noted that inductive elements 403 and 409 because of their high impedance at higher frequencies will also reduce the amount of high frequency signal that are passed in either direction.

The invention is directed to a system and method for transmitting a data signal on an electric power system. It is noted that the foregoing examples have been provided merely for the purpose of explanation and are in no way to be construed as limiting of the invention. While the invention has been described with reference to certain embodiments, it is understood that the words that have been used herein are words of description and illustration, rather than words of limitations. For example, the invention may apply equally to other than low-voltage premise networks, as well as being applied to any part of electric power and data transmission system. Further, although the invention has been described herein with reference to particular means, materials and embodiments, the invention is not intended to be limited to the particulars disclosed herein. Rather, the invention extends to all functionally equivalent structures, methods and uses, such as are within the scope of the appended claims.

Those skilled in the art, having the benefit of the teachings of this specification, may effect numerous modifications thereto and changes may be made without departing from the scope and spirit of the invention in its aspects. Those skilled in the art will appreciate that various changes and adaptations of the invention may be made in the form and details of these embodiments without departing from the true spirit and scope of the invention as defined by the following claims.

What is claimed is:

1. A method of communicating a data signal via an internal low voltage premise network, comprising:
    transmitting the data signal over the internal low voltage premise network;
    substantially reducing attenuation of the data signal caused by one or more power line non-communication devices coupled to the internal low voltage premise network; and
    receiving the data signal with a power line communication device.

2. The method of claim 1, wherein at least one power line non-communication device includes a decoupling capacitor.

3. The method of claim 1, wherein at least one power line non-communication device is an appliance.

4. The method of claim 1, wherein the substantial reduction of the attenuation of the data signal is accomplished by an impedance device whose impedance varies with frequency.

5. The method of claim 4, wherein the impedance device exhibits a higher impedance at higher frequencies.

6. The method of claim 4, wherein the impedance device is part of one of the following: a receptacle, a circuit panel, an electrical appliance, and an electrical power strip.

7. The method of claim 4, wherein the impedance device exhibits a lower impedance at lower frequencies.

8. The method of claim 1, wherein the power line communication device comprises a computer.

9. The method of claim 1, wherein the power line communication device comprises a power line interface device.

10. The method of claim 1, further comprising reducing high frequency signals provided to at least one power line non-communication device via the low voltage premise network.

11. The method of claim 1, further comprising reducing high frequency signals provided to the low voltage premise network by the at least one power line non-communication device.

12. A system for communicating a data signal on an internal low voltage premise network, comprising:
    a power line communication device that communicates the data signal;
    a power line non-communication device coupled to the internal low voltage premise network, wherein the power line non-communication device attenuates data signals; and
    a filter device coupling the power line non-communication device to the internal low voltage premise network, wherein the filter device substantially reduces attenuation of the data signal by the power line non-communication device.

13. The system of claim 12, wherein the characteristics of the filter device are a function of at least one of the following: frequency of the data signal, desired data signalto-noise ratio, and desired high frequency isolation between device and internal low voltage premise network.

14. The system of claim 12, wherein the filter device is located within at least one of the following: a receptacle, a circuit panel, an electrical appliance, and an electrical power strip.

15. The system of claim 12, wherein the filter device presents a higher impedance to the data signal and a lower impedance to a power signal carried by the internal low voltage premise network.

16. The system of claim 12, wherein the filter device includes at least one of the following: inductors, ferrites, and capacitors.

17. The system of claim 12, wherein the filter device has a current rating equal or greater than the current carried by the internal low voltage premise network.

18. A device for facilitating the communication of a data signal on an internal low voltage electric power network, comprising:
   a first interface port in coupled to a power line non-communication device that receives electric power from the internal low voltage electric power network and wherein the power line non-communication device attenuates data signals;
   a second interface port coupled to the internal low voltage electric power network; and
   an inductive element in communication with the first and second interface port, wherein the inductive element substantially reduces attenuation of the data signal carried on the internal low voltage electric power network.

19. The device of claim 18, wherein the second interface port is coupled to at least one of the following: a "hot" conductor, a neutral conductor, a ground conductor.

20. The device of claim 18, wherein the power line non-communication device is an electrical appliance.

21. The device of claim 18, wherein the device is a part of one of the following: a receptacle, a circuit panel, an electrical appliance, and an electrical power strip.

22. The device of claim 18, further comprising a high frequency shunt circuit that reduces reception of the data signal by the power line non-communication device.

23. The device of claim 22, wherein the high frequency shunt circuit comprises a capacitor.

24. The device of claim 22, wherein the high frequency shunt circuit reduces high frequency signals provided to the internal low voltage premise network by the power line non-communication device.

25. The device of claim 22, wherein the high frequency shunt circuit reduces high frequency signals provided to the power line non-communication device by the internal low voltage premise network.

26. The device of claim 18, further comprising a metal oxide varistor and a gas discharge tube that provide low capacitance transient voltage and current protection.

27. A method of communicating a data signal on an internal low voltage power network, comprising:
   providing the data signal to the internal low voltage power network;
   modifying the characteristics of the internal low voltage power network to substantially reduce the data signal transmitted to a power line non-communication device located on the internal low voltage power network without substantially reducing a power signal provided by the internal low voltage power network; and
   transmitting the data signal to a power line communication device.

28. A method of communicating a data signal with an internal low voltage premise network, comprising:
   communicating the data signal with the internal low voltage premise network;
   substantially reducing a degradation of the data signal caused by one or more power line non-communication devices coupled to the internal low voltage premise network; and
   communicating the data signal with a power line communication device.

29. A method of communicating a data signal on an internal low voltage power network, comprising:
   modifying the characteristics of the internal low voltage power network to prevent a power line non-communication device on the internal low voltage power network from attenuating the data signal;
   transmitting the data signal to a power line communication device on the internal low voltage power network; and
   receiving the data signal with the power line communication device.

* * * * *

UNITED STATES PATENT AND TRADEMARK OFFICE
CERTIFICATE OF CORRECTION

| | |
|---|---|
| PATENT NO. | : 7,199,699 B1 |
| APPLICATION NO. | : 10/150694 |
| DATED | : April 3, 2007 |
| INVENTOR(S) | : Gidge |

It is certified that error appears in the above-identified patent and that said Letters Patent is hereby corrected as shown below:

On The Title Page Item -56- Page 3, under "Foreign Patent Documents", line 3, delete "EP 0 581 361 A1 2/1994" and insert -- EP 0 581 351 A1 2/1994 --, therefor.

On The Title Page Item -56- On page 4, under "Other Publications", line 16, delete "EMECTCON" and insert -- EMETCON --, therefor.

On The Title Page Item -56- On page 4, under "Other Publications", line 30, delete "PAS-99(40)," and insert -- PAS-99(4), --, therefor.

In column 4, line 34, delete "(e.g, a" and insert -- (e.g., a --, therefor.

In column 10, line 16, in Claim 27, delete "transmitted to" and insert -- attenuation caused by --, therefor.

In column 10, line 28, in Claim 28, delete "a degradation" and insert -- attenuation --, therefor.

Signed and Sealed this

Nineteenth Day of June, 2007

JON W. DUDAS
*Director of the United States Patent and Trademark Office*